Figure 1:
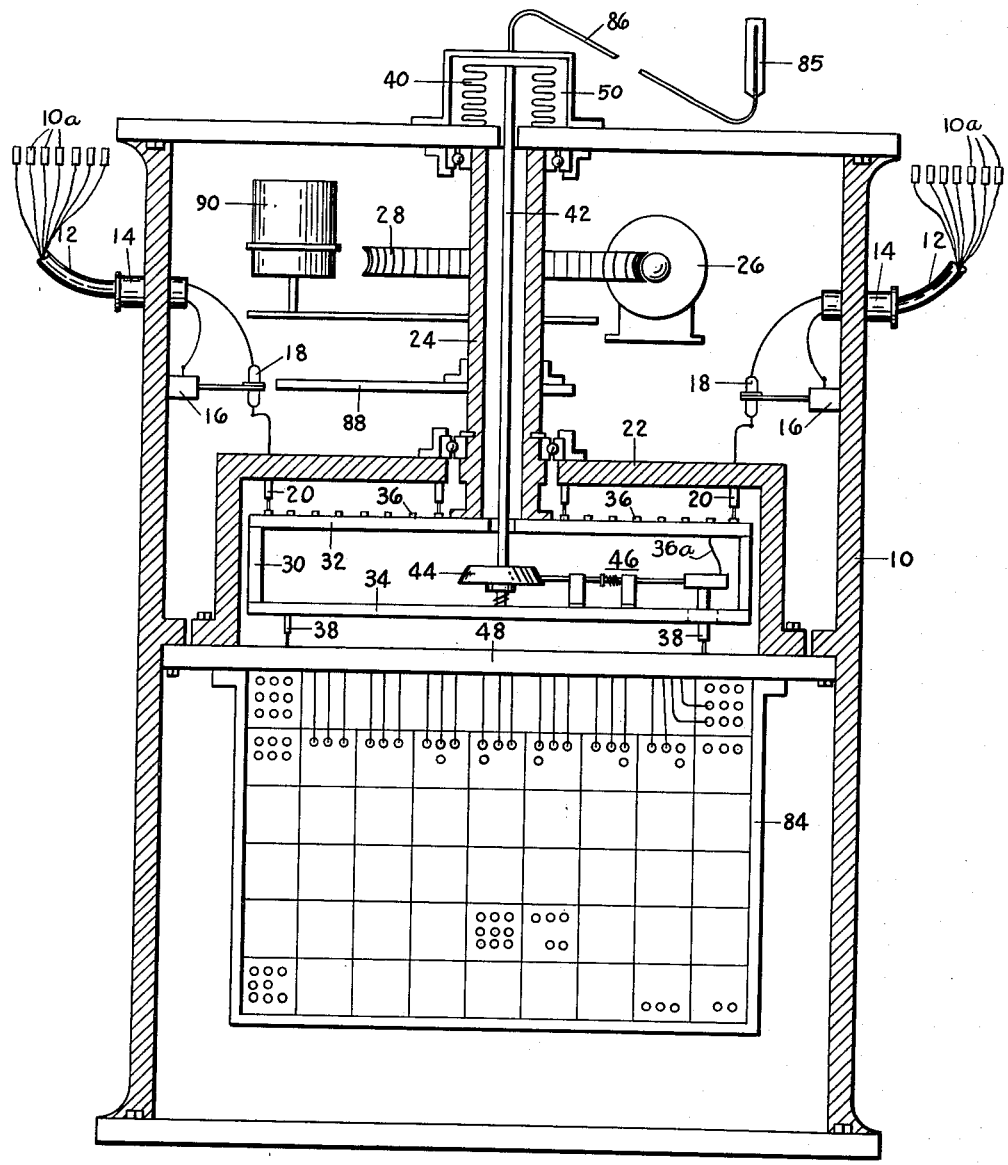

Sept. 26, 1961  R. E. PETERSON  3,002,178
VELOCITY COMPENSATING APPARATUS FOR SONAR SYSTEMS
Filed Jan. 16, 1956  2 Sheets-Sheet 1

INVENTOR.
ROBERT E. PETERSON
BY George Sipkin
Lee L. Huntzberger
ATTORNEYS

Sept. 26, 1961 R. E. PETERSON 3,002,178
VELOCITY COMPENSATING APPARATUS FOR SONAR SYSTEMS
Filed Jan. 16, 1956 2 Sheets-Sheet 2

INVENTOR.
ROBERT E. PETERSON
BY George Sipkin
Lee A. Huntzberger
ATTORNEYS

United States Patent Office 3,002,178
Patented Sept. 26, 1961

3,002,178
VELOCITY COMPENSATING APPARATUS FOR SONAR SYSTEMS
Robert E. Peterson, Old Lyme, Conn., assignor to the United States of America as represented by the Secretary of the Navy
Filed Jan. 16, 1956, Ser. No. 559,491
19 Claims. (Cl. 340—6)
(Granted under Title 35, U.S. Code (1952), sec. 266)

The invention described herein may be manufactured and used by or for the Government of the United States of America for governmental purposes without the payment of any royalties thereon or therefor.

This invention relates to apparatus incorporated in a sonar system for adjustably delaying sonar signals and, more particularly, to novel apparatus for adjustably delaying sonar signals in accordance with the velocity of mechanical vibrations through the fluid medium in which the sonar system operates.

Sonar systems, which are well known in the art, are utilized for echo ranging, direction finding, or both, of an object or objects in a fluid medium such as sea water. In all cases, the information obtained depends upon the relative timing of signals transmitted and/or received by the sonar system. The relative timing of the signals, in turn, depends upon such factors as the location and spatial orientation of the transducer means transmitting or receiving the signals, the distance to and the direction of any particular target or sound source, and the velocity of mechanical vibrations through the fluid medium. The velocity of mechanical vibrations through a fluid medium is not a constant, but is a function of various characteristics thereof, such as temperature and salinity. The present invention contemplates providing novel adjustable time-delay means, whereby the velocity of mechanical vibrations through the fluid medium may be determined and variations therein may be compensated for. Briefly, this is accomplished by means of a multitapped lag line, and means for automatically selecting the particular taps on the lag line to which signals are applied in accordance with the velocity of mechanical vibrations through the fluid medium.

The old methods of providing corrections for the changes in the velocity of mechanical vibrations through a fluid medium required either a manual adjustment of a variable lag line or a physical replacement of the means for selecting the particular taps on the lag line. Those systems which employ the variable lag line are complicated by variable impedance and phase-shift problems and require additional electronics for regulation thereof. Replacement of the selecting means is impractical.

Although this invention may be employed in any type of sonar system, it is particularly suited for use with transducer means employing a listening array of spaced hydrophones, such as is incorporated in a submerged harbor unit.

It is therefore an object of this invention to provide apparatus to be incorporated in a sonar system for determining and compensating for changes in the velocity of mechanical vibrations through the fluid medium in which the sonar system is operated.

It is a further object of this invention to provide an adjustable time delay means incorporated in a sonar system which is capable of compensating for variations in the velocity of mechanical vibrations through the fluid medium in which the sonar system is operated.

It is a still further object of this invention to provide an adjustable multitapped lag line, and movable means coupled thereto, for properly phasing signals applied thereto from each hydrophone of an array of spatially oriented hydrophones.

Figure 2:
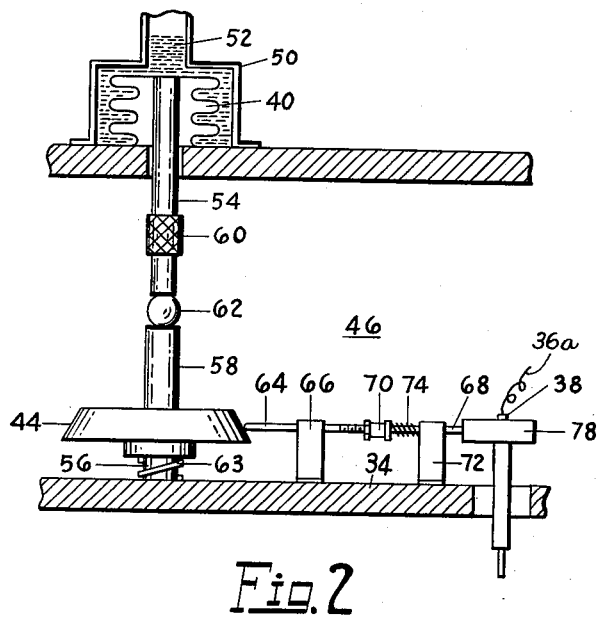
Figure 3:
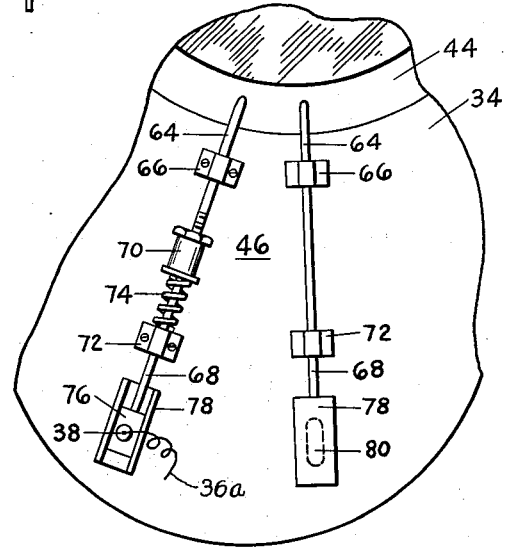
Figure 4:
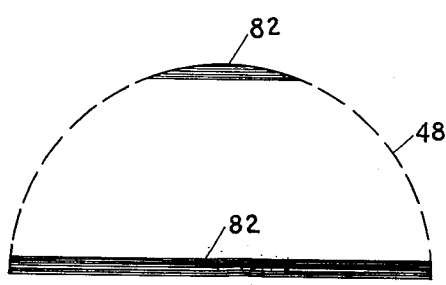

Other objects and many of the attendant advantages of this invention will be readily appreciated as the same becomes better understood by reference to the following detailed description when considered in connection with the accommpanying drawings wherein:

FIG. 1 is a diagrammatic elevation view, partly in section, of a submerged sonar harbor unit incorporating a preferred embodiment of the invention, FIG. 2 is a diagrammatic elevation view, partly in section, of the movable adjustable mechanism contained in the preferred embodiment shown in FIG. 1, FIG. 3 is a diagrammatic plan view of the movable adjustable mechanism shown in FIG. 2, and FIG. 4 is a diagrammatic plan view of the commutator plate used in the preferred embodiment shown in FIG. 1.

The drawings are not meant to be structurally exact, but are meant only to illustrate clearly the cooperative relationship of the significant elements composing the preferred embodiment of the invention. In order to accomplish this distortion of unessential elements among the several figures, especially FIGS. 2 and 3, has been resorted to.

Referring now to the drawings, FIG. 1 illustrates a submerged sonar harbor unit which is included within a cylindrical case 10. The transducer means for the submerged harbor unit, which is shown only schematically in the drawings, consists of an array of spatially oriented omnidirectional hydrophones 10a located in the fluid medium, i.e., seawater, which surrounds case 10. The hydrophone array generally used with the preferred embodiment of the invention consists of 48 hydrophones equally spaced about the circumference of a circle of 24 foot diameter. Each hydrophone of the array is coupled into case 10 by a cable 12 which enters case 10 through a seal fitting 14. Seal fittings 14 are circumferentially disposed about case 10.

One wire of each cable 12 is connected directly to metallic ring 16, which serves as an electrical ground. The other wire of each cable 12 is connected through a mercury switch 18 to a separate stationary brush 20. Stationary brushes 20 are fixedly connected to brush block 22 and are arranged, as shown, equally spaced along the diameter of a circle which is concentric about the axis of case 10.

A rotatable hollow shaft 24 is rotated by means of motor 26 and gear means 28. Rotatable shaft 24 is oriented, as shown, coaxial with case 10. Shaft 24 supports a rotatable brush array plate means 30, which includes a top brush array plate 32 and a bottom brush array plate 34. Fixed to top brush array plate 32 and rotatable therewith are slip rings 36 which are arranged on concentric circles about the axis of case 10. The location of slip rings 36 is such as to make rubbing contact with the respective stationary brushes 20. Each of rotatable slip rings 36 is electrically connected, as shown, by a conductor 36a, to two separate diametrically opposite rotatable brushes 38 which are attached to bottom brush array plate 34. Brushes 38 are circumferentially disposed about a circle which is concentric with the axis of case 10. The diameter of the circle on which rotatable brushes 38 lie may be adjusted between limits about a mean diameter, which in the preferred embodiment of the invention is 12 inches. The mechanism for adjusting the diameter of the circle formed by brushes 38 consists of bellows 40, shaft means 42, conical cam 44, and shaft means 46, all of which are shown in detail in FIGS. 2 and 3. Brushes 38 make contact with commutator plate 48, which is shown in detail in FIG. 4. The plate 34 has a radially elongated slot 34b (FIG. 2) through which each brush 38 extends and in which it may move radially to a limited extent.

Referring now to FIGS. 2 and 3, bellows 40 is enclosed in container 50, shown also in FIG. 1, which is partially filled with butane. Shaft means 42 comprises a first section 54 which is fixedly attached to the top of bellows 40, as shown. Shaft means 42 also includes a mounting pin 56 which is fixedly attached to lower brush array plate 34, shown in FIGS. 1 and 3. Conical cam 44 and shaft 58, which is integral therewith, is mounted on mounting pin 56 as shown. Shaft 58 has an axial bore cut part way therethrough from its lower end slidably receiving pin 56 to allow axial motion between pin 56 and cam 44. Shaft means 42 further includes an adjustable collar pin 60 which is in threaded contact with the lower end of shaft 54. A ball bearing 62 couples the lower end of pin 60 to the top of shaft 58 as shown. Compression spring 63, bearing against lower brush array plate 34 and cam 44, maintains shaft 58 in contact with ball bearing 62 at all times.

Shaft means 46 comprises a plurality of shafts 64 bearing against and circumferentially disposed about cam 44. Shafts 64 extend radially from cam 44. Guides 66 support shafts 64, allowing radial motion thereof. Guides 66 are secured to lower brush array plate 34. Shaft means 46 further includes shafts 68 which are coupled to shafts 64 by insulator couplings 70, as shown. Guides 72, similar to guides 66 support shafts 68. Compression springs 74, situated between insulator couplings 70 and guides 72 urge shafts 64 into positive contact with cam 44. The other ends of shafts 68 are connected as shown in FIG. 3 to blocks 76. Blocks 76 support rotatable spring loaded brushes 38 and ride in guideblocks 78. Guideblocks 78 have grooves 80 in the lower portion thereof to allow radial motion of brushes 38, which pass therethrough so brushes 38 are able to make contact with commutator plate 48, shown in FIGS. 1 and 4.

Referring now to FIG. 4, commutator plate 48 consists of a large plurality of parallel spaced conductor wires or bars 82. There are approximately 60 conductor bars per inch. Since commutator plate 48, which has a semicircular configuration, as shown, may have a radius of ten inches or more, there are at least 600 conductor bars 82 in all. Rotatable brushes 38, which make contact with conductor bars 82, are arranged in a circle which is concentric with commutator plate 48. Half of rotatable brushes 38 at any moment may make contact with conductor bars 82. The radius of the circle formed by brushes 38, of course, depends upon the position of cam 44.

Returning again to FIG. 1, each of conductor bars 82 of FIG. 4 is connected to a particular tap on multitapped lag line assembly 84. An element 85, sensitive to temperature is placed in the surrounding fluid medium. The tube 86 connects element 85 with container 50.

Fixedly attached to rotatable shaft 24 is a switching magnet 88, which is in proximity to mercury switches 18. Switching magnet 88 has a semi-circular configuration in the plane perpendicular to the axis of case 10. Bearing synchro 90 has its rotor coupled to rotatable shaft 24, as shown.

The operation of the invention will now be considered. The relative phase of signals received by the respective hydrophones of the array from any particular distant source is a function of the direction of that source, the spatial orientation of the hydrophones of the array, and the velocity of mechanical vibrations through the fluid medium in which the array is immersed. In other words, a signal from a particular distant source will first reach the hydrophone of the array which faces in the direction of that source and reach each of the other hydrophones of the array at a later time which depends upon the distance of each of the other hydrophones from the first-mentioned hydrophone and the velocity and direction of travel of the mechanical vibrations through the fluid medium.

It will be seen that by differentially delaying the signals received by each of the hydrophones a proper amount, i.e., delaying the signal from the hydrophone which faces in the direction of the distant source a maximum amount and delaying the signals from each of the other hydrophones by amounts which are inverse functions of the distance between each of the other hydrophones and the first-mentioned hydrophone, the signals received by the respective hydrophones may be brought into phase with each other. Signals received by the respective hydrophones of the array which arrive from some other direction than that of the particular distant source will not be differentially delayed by the proper amounts to provide an in-phase output. Thus, by providing differential delays of the proper amounts, the array of hydrophones becomes a highly sensitive and a highly directional sonar receiver. The array of hydrophones may be scanned by a suitable switching arrangement, so as to sequentially derive an in-phase output from signals arriving from each and every direction.

In the preferred embodiment of the invention, shown in the drawings, multitapped lag line assembly 84 differentially delays signals applied thereto. Signals from the hydrophone array are applied to lag line assembly 84 through cables 12, mercury switches 18, stationary brushes 20, rotatable slip rings 36, rotatable brushes 38, and commutator plate 48.

Mercury switches 18 are normally open, but are closed when in proximity to switching magnet 88. Since switching magnet 88 has a semi-circular cross section, one-half of mercury switches 18 are closed at any one time. Furthermore, since switching magnet 88 is fixedly attached to rotatable shaft 24, it rotates therewith at a constant angular velocity determined by the speed of motor 26. As switching magnet 88 rotates, the next successive mercury switch 18 is switched on while simultaneously the mercury switch 18 diametrically opposed thereto is switched off.

Bearing synchro 90, which has its rotor coupled to rotatable shaft 24, provides a signal indicative of the instantaneous angular position of switching magnet 88. The signal provided by bearing synchro 90 is used to control the sweep of the sonar plan position indicator, not shown, in a manner well known in the art.

The signals from the respective hydrophones pass through the one-half of mercury switches 18 which are switched on at any moment to those stationary brushes 20 which are connected thereto, and from there to the rotatable slip rings 36 which are in contact with those stationary brushes 20. The signals appearing on slip rings 36 are applied to rotatable, circularly disposed brushes 38, which are electrically connected to rotatable slip rings 36. One-half of rotatable brushes 38 make rubbing contact with conductor bars 82, FIG. 4, of commutator plate 48 at any one time, since, as shown, the commutator plate 48 is semicircular in shape.

Since each of conductor bars 82 is connected to a particular separate tap on multitapped lag line assembly 84, the differential delays experienced by the respective signals depend upon the particular conductor bars 82 with which each of rotatable brushes 38 make contact. This in turn depends upon the instantaneous angular position of switching magnet 88 and the radius of the circle on which rotatable brushes 38 are disposed. The instantaneous angular position of switching magnet 88 determines the relative delay which each of the signals applied to lag line assembly 84 experiences, and the length of the radius of the circle on which rotatable brushes 38 are disposed determines the absolute quantities of the delays experienced by the signals applied to lag line assembly 84.

From the foregoing discussion of the factors which determine the relative phase of signals received by the respective hydrophones, it is clear that the absolute quantities of the delays experienced by the signals applied to lag line assembly 84 must be proportional to the velocity of mechanical vibrations through the fluid medium in which the hydrophone array is immersed, in order to provide an in-phase output from lag line assembly 84. Therefore, the length of the radius of the circle on which rotatable brushes 38 are disposed must be proportional to the velocity of mechanical vibrations through the fluid medium in which the hydrophone array is immersed. Since this velocity is a function of the temperature of the fluid medium, the length of the radius of the circle on which rotatable brushes 38 are disposed must be adjusted in order to compensate for any changes in this velocity due to changes in the temperature of the fluid medium. The heart of the invention lies in the means for accomplishing this adjustment.

The means for adjusting the length of the radius of the circle on which rotatable brushes are disposed consists of temperature sensitive element 85, tube 86, container 50 which is partially filled with butane 52, FIG. 2, bellows 40, shaft means 42, including the components thereof, shown in FIG. 2, conical cam 44, and shaft means 46 including the components thereof, shown in FIGS. 2 and 3.

Butane 52 in container 50, partially vaporizes and passes through tube 86 to element 85. The vapor pressure of the butane is very nearly a linear function of temperature over the limited range involved here. Therefore, the vapor pressure of the butane vapor rises with increases in the temperature of the fluid medium surrounding element 85 and decreases with a drop in the temperature of the fluid medium. An increase in the vapor pressure of the butane vapor causes bellows 40 to be compressed, and vice versa. This causes shaft 54, which is fixedly attached to the top of bellows 40, to bear down harder on ball bearing 62, and therefore, shaft 58 which is integral with cam 44. This causes spring 63 to be compressed and cam 44 to be moved downward in an axial direction. Adjustable collar pin 60 allows initial adjustment of the axial position of cam 44 to enable establishment of a reference point for calibration purposes.

The axial position of cam 44, which is determined by the temperature of the surrounding fluid medium, controls the position of circumferentially disposed radially extending shafts 64, shown in FIGS. 2 and 3, since shafts 64 bear thereagainst under the bias provided by spring 74. Since each of brushes 38 is coupled to each of shafts 66 by means of block 76, shaft 68 and coupling 70, any change in the axial position of cam 44 will cause all of brushes 38 to be simultaneously moved in a radial direction. By means of coupling 70 the mean radial length of the circle on which brushes 38 are disposed may be adjusted.

If extreme accuracy in velocity compensation is required, the conical surface of cam 44 may be curved to take into account the very small second-order, non-linear factors in the adjustment means.

Thus, it will be seen that by the means just described, the differential delays provided by lag line assembly 84 will be automatically adjusted to compensate for any changes in the velocity of the surrounding fluid medium.

A slight modification of this invention, not illustrated, which may be used in the alternative, involves the elimination of temperature sensitive element 85, tube 86, container 50, butane 52 and bellows 40, and the substitution therefor of a threaded end on shaft 54, and velocity-calibrated dial means which directly or indirectly are attached to this threaded end for raising or lowering shaft 54 in an axial direction in response to the turning thereof.

In this last-described modification of the invention, changes in the velocity of the surrounding fluid medium are compensated for in the following manner: Means are provided for measuring the amplitude of the algebraic sum of the signals derived from the output of lag line assembly 84, and the velocity-calibrated dial means are turned until a maximum output is indicated on the measuring means. This indication signifies that the respective outputs of lag line assembly 84 are all in phase. Then, the value of the velocity of the fluid medium may be read directly off the velocity-calibrated dial means.

Obviously many modifications and variations of the present invention are possible in the light of the above teachings. It is therefore to be understood that within the scope of the appended claims the invention may be practiced otherwise than as specifically described.

I claim:

1. A device for determining the direction from which sounds come in a fluid medium, which comprises electromechanical transducer means adapted to be placed in a selected array in a fluid medium which transmits mechanical vibrations therethrough with a velocity which is a function of a physical characteristic of said fluid medium; signal translating means including mechanically adjustable time delay means for delaying a signal passing therethrough, and means for effectively coupling said time delay means in series with said transducer means; movable means coupled to said translating means for adjusting the magnitude of the delay provided by said time delay means in order to compensate for variations in velocity of said mechanical vibrations through said fluid medium, and means sensitive to said characteristic of said medium which affects the rate of sound transmission operable, when said sensitive means is immersed in said medium, on said movable means to adjust the latter in the magnitude of the delay in accordance with variations in said characteristic of said medium.

2. The combination defined in claim 1, wherein said sensitive means is operated by variations in the temperature of said fluid medium in which it may be placed.

3. In a device for determining through a utilization circuit the direction from which sounds come in a fluid medium, that improvement which comprises a housing, a plurality of hydrophones, a plurality of twin wire cables, for individual connection to said plurality of hydrophones, entering said casing, an individual switch in each cable and said switches being arranged in sequence in a circle, a member in said casing and mounted for rotation about an axis approximately at the center of said circle, a plurality of slip rings carried by said member and insulated from and concentric to each other and to said axis, two brushes bearing on each of said slip rings and individually connected to said cables leading to oppositely arranged hydrophones, means rotating with said member for closing the switches in approximately one half of the said circle at any time, in sequence as said member rotates, a plurality of additional brushes arranged in sequence along a circle concentric with the axis of rotation of said member, each said additional brush being electrically connected to a related slip ring, means on said member for individually mounting each said additional brush for rotation together with said member and for individual limited movement thereon in a direction radially of said axis of rotation, means urging all of said additional brushes in the same radial direction, a cam adjacent said member and operable to simultaneously force all of said brush mounting means equally and radially in the direction which is opposite from that caused by said urging means an amount depending on the position of said cam relatively to said brush mounting means, means automatically responsive to variations in a physical characteristic of a fluid medium in which it may be exposed for selectively moving said cam in directions to cause movements of all of said brush mounting means in one direction or the other depending upon the nature of the variations in said characteristic of said medium that affects the rate of sound travel in said medium, a commutator with straight strips over and in contact with which said additional brushes move during their rotation with said member, and a lag line assembly having taps connected individually to said commutator strips.

4. The device as set forth in claim 3, wherein said means responsive to variations is responsive to the temperature of said medium in which it may be immersed, for causing movement of said cam in directions to cause radial movements of said brushes proportionally to variations of said temperature.

5. In a device for determining through a utilization circuit the direction from which sounds come in a fluid medium, that improvement which comprises a plurality of hydrophones, a plurality of electrical circuits for individual connection to said plurality of hydrophones, a rotatable member, a plurality of brushes, means mounting said brushes on said member in a circular row for rotation therewith and also for individual movement toward and from the axis of rotation of said member so that the brushes may rotate with said member in circles at different radial distances from said axis of rotation, a commutator plate with strips insulated from one another, over a face of which said brushes move in contact therewith, a lag line for connection to said circuit having taps to said individual commutator strips, means for establishing connections from said electrical circuits to said brushes during rotation of said brushes, and a cam with an axially tapered periphery disposed with its axis approximately coincident with the axis of rotation of said member, means mounting said cam for limited movement in directions along its axis, said brushes being mounted for movements radially of said axis and having extensions disposed radially of said axis of rotation, bearing endwise against the tapered periphery of said cam, and operable radially by axial movement of said cam to cause movement of said brushes away from said axis of rotation upon axial movement of the cam in one direction, means continually urging said brush extensions against said cam periphery, whereby axial movement of said cam will change the diameter of the circular path through which said brushes move over said commutator and thus vary the amount of lag introduced into said utilization circuit, and means for operating said cam in axial directions.

6. The device as set forth in claim 5, wherein said cam operating means includes means automatically responsive to a variable physical characteristic of said fluid medium for causing axial movements of said cam proportionally to variations in said variable characteristic of said medium.

7. The device as set forth in claim 6, wherein said automatically responsive means is responsive to the temperature of said medium to which it is exposed.

8. The device as set forth in claim 6, wherein said medium is water in which said automatically responsive means may be immersed.

9. The device as set forth in claim 6, wherein said cam has an axial extension along the axis of and beyond said member, and said automatically responsive means includes a bellows operable on said cam extension to move the latter in one direction along the axis of rotation of said member, and a confined fluid immersed in said medium to be responsive to temperature changes therein and operable on said bellows to compress the latter, and means for continuously urging said cam and its extension against said bellows.

10. In a device for determining in a utilization circuit the direction from which sounds come in a fluid medium, that improvement which comprises a plurality of hydrophones, a plurality of circuits for individual connection to said plurality of hydrophones to be arranged in a selected circular array, a switch in each of said circuits and said switches being arranged in a circle, a rotatable member whose axis of rotation is approximately at the center of said circle, means rotatable with said member for operating approximately half of said switches at a time, said half of the switches varying progressively around said circle as said member rotates, said member having a plurality of slip rings concentric with said axis of rotation, a plurality of brushes individually connected electrically to said switches and bearing on said slip rings, with brushes from each two diametrically opposite switches bearing on the same slip ring, a plurality of additional brushes arranged about said axis of rotation, carried on said member, and each electrically connected to a related slip ring, a semi-circular commutator with individual conducting strips in a face thereof on which said additional brushes bear as they rotate with said member, and lag line circuit means connected by taps to said commutator strips.

11. The device as set forth in claim 10, and means automatically responsive to a variable physical characteristic of said fluid medium in which said sounds travel and to which this means is exposed for causing movement of said additional brushes toward and from the axis of rotation of those additional brushes upon changes in said characteristic of said medium and compensate in said lag lines for changes in the velocity of sound in said medium with changes in said characteristic of said medium.

12. The device as set forth in claim 10, and a bearing synchro operated with said member to indicate the position of said switch operating means at all times.

13. The device as set forth in claim 10, wherein said switches are magnet operated, mercury switches, and said means rotatable with said member for operating said switches is a magnet having half of its peripheral edge semi-circular and movable in close proximity to said switches to operate the same, the balance of said peripheral edge being much closer to the axis of rotation of said magnet and having no operative action on the switches.

14. The device as set forth in claim 11, wherein said automatically responsive means is responsive to the temperature to which it is exposed.

15. In a device for determining in a utilization circuit the direction from which sounds come in a fluid medium, that improvement which comprises a plurality of hydrophones, a plurality of circuits for individual connection to said plurality of hydrophones to be arranged in a selected array in said medium, a rotatable member having a passage along its axis of rotation, a plurality of brushes arranged in a circular row on an end face of said member and also mounted on said member for limited movement radially of said axis of rotation, a cam having a frusto-conical periphery arranged with its axis coincident with said axis of rotation, means bearing on said cam periphery, mounted on said member for movement radially of said axis of rotation, and operable on said brushes to urge them to their outer limits of radial movements when said cam moves axially to bring a larger diameter of its periphery on the means which bears against it, means yieldingly urging said brushes toward said axis of rotation, a commutator with strips over, and in contact with which, said brushes travel during their rotation with said member, lag line circuits connected to said commutator strips, means connecting said hydrophone circuits to said brushes during rotation of said member, and means, including a part extending along said passage to the exterior of said member, for moving said cam along said axis of rotation and by its engagement with said brush moving means causing movement of said brushes radially to vary the radius of movement of said brushes over said commutator.

16. The device as set forth in claim 15, in which said means for moving said cam includes a bellows operable on said extending part to move said came in one axial direction, resilient means urging said cam in the other axial direction against the action of said bellows, and means responsive to a variable physical characteristic of said medium for causing operation of said bellows and through it of said cam proportionally to changes in said characteristic of said medium.

17. The device as set forth in claim 16, wherein said bellows is responsive to temperature changes of said medium.

18. In apparatus for determining the direction from which sounds come in a fluid medium, of the type where the signals are picked up by a plurality of transducers and converted into phase with one another before delivery to a utilization circuit, that improvement which comprises a plurality of individual electromechanical transducer means that can be arranged in a selected array in said fluid medium of the type that transmits mechanical vibrations therethrough with a velocity which is a function of a physical characteristic of said medium, a plurality of time delay devices, means for selectively connecting a group of consecutively adjacent transducer means to individual ones of said time delay devices, and means automatically responsive to changes in the said physical characteristic of said medium for varying the particular ones of individual time delay devices to which the transducer means are connected with varying changes in said characteristic.

19. In a device for ascertaining the direction from which sounds are received in a fluid medium in which the sounds are received by an array of transducers, converted to electric signals, and placed in phase with one another before delivery to utilization means, that improvement therein comprising a commutator plate having a large plurality of thin, spaced, straight, parallel conductor bars, a plurality of brushes in contact with some of said conductor bars, said brushes being arranged in a circle, part of which circle passes over said bars, means mounting said brushes for rotation about the center of said circle, means including a conically tapered cam for also simultaneously moving all of said brushes on said mounting means in directions radially of said circle to vary the radial distance of said brushes from the center of said circle and thereby vary the particular said bars on which the brushes bear, means for passing signals from said transducers to said brushes, and means responsive to a physical characteristic of said medium that affects velocity of sound therethrough for moving said cam in directions parallel to the axis of the cam in accordance with changes in said characteristic, and time delay devices connected to said bars for placing said signals from said transducers in phase with one another for delivery to said utilization means.

References Cited in the file of this patent

UNITED STATES PATENTS

| | | |
|---|---|---|
| 2,147,657 | Kunze | Feb. 21, 1939 |
| 2,222,006 | Uhing | Nov. 19, 1940 |
| 2,378,555 | Jasse | June 19, 1945 |
| 2,752,584 | Burke | June 26, 1956 |
| 2,786,986 | Cobbett | Mar. 26, 1957 |